(12) United States Patent
Shen et al.

(10) Patent No.: US 12,523,498 B2
(45) Date of Patent: Jan. 13, 2026

(54) TIME-AWARE OCCUPANCY GRID MAPPING FOR ROBOTS IN DYNAMIC ENVIRONMENTS

(71) Applicant: Intel Corporation, Santa Clara, CA (US)

(72) Inventors: Yingzhe Shen, Beijing (CN); Zhigang Wang, Beijing (CN); Xuesong Shi, Beijing (CN)

(73) Assignee: Intel Corporation, Santa Clara, CA (US)

( * ) Notice: Subject to any disclaimer, the term of this patent is extended or adjusted under 35 U.S.C. 154(b) by 314 days.

(21) Appl. No.: 17/299,722

(22) PCT Filed: Dec. 12, 2018

(86) PCT No.: PCT/CN2018/120493
§ 371 (c)(1),
(2) Date: Jun. 3, 2021

(87) PCT Pub. No.: WO2020/118545
PCT Pub. Date: Jun. 18, 2020

(65) Prior Publication Data
US 2022/0057232 A1 Feb. 24, 2022

(51) Int. Cl.
*G01C 21/00* (2006.01)
*G01C 21/32* (2006.01)

(52) U.S. Cl.
CPC ..... *G01C 21/3881* (2020.08); *G01C 21/3848* (2020.08); *G01C 21/3859* (2020.08)

(58) Field of Classification Search
CPC ............ G01C 21/3881; G01C 21/3848; G01C 21/3859; G01S 13/931; G01S 15/89;
(Continued)

(56) References Cited

U.S. PATENT DOCUMENTS 10,303,178 B1 * 5/2019 Gutmann .............. B60W 30/09
10,482,196 B2 11/2019 Eckart et al.
(Continued)

FOREIGN PATENT DOCUMENTS

CN 108596974 B 8/2020
WO 2018091386 A1 5/2018

OTHER PUBLICATIONS

International Preliminary Report on Patentability issued on Jun. 8, 2021 for corresponding PCT/CN2018/120493.
(Continued)

*Primary Examiner* — Nga X Nguyen
(74) *Attorney, Agent, or Firm* — Banner & Witcoff, Ltd.

(57) ABSTRACT

A time-aware occupancy mapping using regression to unknown ("RTU") analysis, and an apparatus to dynamically allocate occupancy probability to a cell in an environment to thereby form a time-aware occupancy map of the environment are disclosed. The apparatus includes a memory circuitry in communication with a processor circuitry, the memory circuitry configured to receive and store probability information from the processor circuitry and to store the probability value and its corresponding time stamp at a probability table. The processor circuitry may be configured to, among others: (1) receive occupancy information, the occupancy information defining whether a first of a plurality of cells (102, 104, 106 and 108) in the environment is occupied; (2) determine a first probability value that the first cell is occupied at a first point in time; (3) direct the first probability value and its corresponding timestamp to the memory circuitry to store; (4) determine a second probability value that the first cell is occupied at a second point in time, the second point in time defined by a lapsed interval from the first point in time to the second point in time; and
(Continued)

(5) update the memory circuitry to store the second probability value and its corresponding timestamp.

17 Claims, 7 Drawing Sheets

(58) Field of Classification Search
CPC ...... G01S 15/931; G01S 17/89; G01S 17/931; G01S 13/89
See application file for complete search history.

(56) References Cited

U.S. PATENT DOCUMENTS

| | | |
|---|---|---|
| 10,883,829 B2 | 1/2021 | Irish et al. |
| 2018/0012370 A1* | 1/2018 | Aghamohammadi ........................ G06F 18/251 |
| 2018/0173239 A1 | 6/2018 | Yoon et al. |
| 2019/0049580 A1* | 2/2019 | Natroshvili ............. G01S 17/89 |
| 2019/0087667 A1* | 3/2019 | Foroughi ............... G06V 20/58 |
| 2019/0232487 A1* | 8/2019 | Spies ................... G05B 13/027 |

OTHER PUBLICATIONS

Written Opinion issued on Aug. 29, 2019 for corresponding PCT/CN2018/120493.
International Search Report issued for corresponding PCT/CN2018/120493 mailed Aug. 28, 2019., 2 pages.
Lunenberg, Janno, et al. "A representative method based on the probability of collision for safe robot navigation in domestic environments," Autonomous Robots, vol. 42, No. 3, pp. 603-604, Mar. 31, 2018.

* cited by examiner

FIG. 1

```
update_map_by_observation(observation):
  occupied_cells, free_cells = parse_observation(observation)
  for cell in occupied_cells:
    log_odds(cell) += update_factor_occupied
    if log_odds(cell) > log_odds_max: log_odds(cell) =
log_odds_max
  for cell in free_cells:
    log_odds(cell) += update_factor_free
    if log_odds(cell) < log_odds_min: log_odds(cell) =
log_odds_min
```

```
import matplotlib.pyplot as plt
import numpy as np alpha = 1
beta = 1
unknown = 0.5
occu_factor = .1/2
free_factor = 9
transit_of = 0.001
transit_fo = 0.001
prob_occu = lambda p: p / ((1 - occu_factor) * p + occu_factor)
prob_free = lambda p: p / ((1 - free_factor) * p + free_factor)
prob_regress = lambda p, step, a=transit_of, b=transit_fo: \
    (p * (b + (1 - a - b) ** step * a) + \
    (1 - p) * (b - (1 - a - b) ** step * b)) / (a + b)

t_range = np.linspace(0, 1000, 1001)
t_occu = [300., 600.]
t_free = [100]

s_tra = list(t_range)
s_new = list(t_range)
for i, t in enumerate(t_range):
    s_tra[i] = unknown if i == 0 else s_tra[i - 1]
    s_new[i] = unknown if i == 0 else prob_regress(s_new[i - 1], 1)
    if t in t_occu:
        s_tra[i] = prob_occu(s_tra[i - 1])
        s_new[i] = prob_occu(s_new[i - 1])
    elif t in t_free:
        s_tra[i] = prob_free(s_tra[i - 1])
        s_new[i] = prob_free(s_new[i - 1])

for t in t_occu:
    plt.plot([t, t], [0, 1], 'k:')
for t in t_free:
    plt.plot([t, t], [0, 1], 'g:')
fh = plt.plot(t_range, s_tra, 'b-', t_range, s_new, 'r-')
plt.axis([t_range[0], t_range[-1], 0, 1.1])
plt.xlabel('time')
plt.ylabel('occupancy probability')
plt.legend(fh, ["Conventional", "RTU Model"], loc='lower right')
plt.show()
```

TIME-AWARE OCCUPANCY GRID MAPPING FOR ROBOTS IN DYNAMIC ENVIRONMENTS

FIELD

The present disclosure generally relates to systems, methods and apparatus for time-aware occupancy mapping in dynamic environments. An specific embodiment is directed to time-aware occupancy mapping using regression to unknown ("RTU") analysis.

BACKGROUND

Self-driving vehicles, automated robots and other robotic devices are increasingly used to perform human tasks. For example, autonomous devices are used to provide to navigate through open or closed environment to implemented assigned tasks. Exemplary environment may include interior spaces of a production floor, a shopping mall, or roads of a city. To perform the desired tasks, the autonomous robot or self-driving vehicle will need to form a map of the environment.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

With advances in robotic technology, autonomous devices are assuming a greater role in production. Certain manufacturing steps are now exclusively handled by robots. Such advances have also provided dynamic or moving robots which are able to travel short and long distances to complete a task. To this end, the autonomous devices (which may include self-driving vehicles and autonomous drones, require a conception map of their surrounding environment. Any robot (including self-driving cars and drones) that can move autonomously must be aware of the obstacles around it. For this reason, occupancy maps are developed.

Occupancy maps are usually in the form of a grid in either two- or three-dimensional spaces. For each cell of the grid, there is a value indicating the probability of that cell being occupied by an object (or an obstacle). These probabilities can be updated according to observations from range sensors like LiDARs, radars, sonars or depth cameras. At each time point in time, only a part of cells (typically a few surrounding cells) in the grid can be observed. Thus, at each observation time, only the observed cells can be updated.

The observation data obtained by performing sensing with the use of the sensing equipment such as a radar is used for estimation of the position and the shape of an object located around the sensor of the autonomous device. The sensors may also determine or estimate whether the object is moving or stationary and compile information correlating each cell in the grid with this information. The conventional methods for detecting presence of an object in a cell of the grid rely on the observation data obtained by using sensors and are based on probabilistic models. Conventional methods are error prone as they fail to consider the continual changes to the environment.

Figure 1:
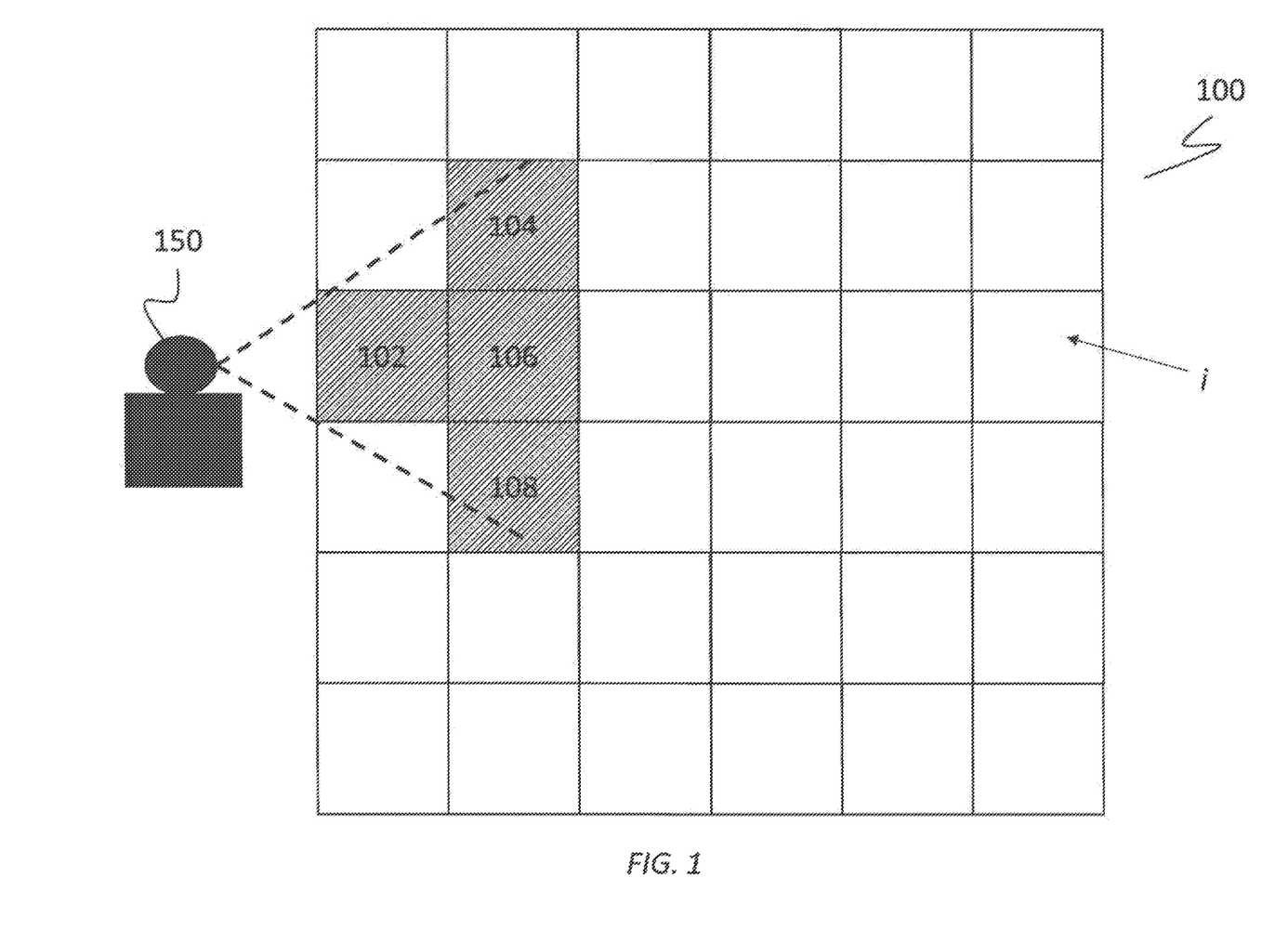
FIG. 1 illustrates and exemplary occupancy map.

FIG. 1 illustrates and exemplary occupancy map. Specifically, FIG. 1 shows autonomous device 150 entering an environment. Portion 100 of the environment is shown as a grid having a plurality of cells i. Each cell typically ranges from 5-50 cm. Autonomous device 150 may be a robot, an autonomous vehicle or any other mobile, self-driving device configured to move about environment 100. Device 150 may be equipped with conventional sensors such as LiDAR, camera, radar, sonar or other sensors/detectors. In the exemplary embodiment of FIG. 1, autonomous device 150 may comprise one or more sensors configure to detect presence of an object in cells 102, 104, 106 and 108. Once an object is detected in one of cells 102, 104, 106 and 108, a probably map may be constructed such that each of cells 102, 104, 106 and 108 is identified as having an occupied probability at a given time. The two values (occupancy probability value and its corresponding timestamp) may be stored at a local or remote database. The stored probability value can be one of a probability value itself or a log odd value of the probability. When an observation has been performed in at timeframe (t), the probability as to whether a cell in the grid which corresponds to the space sensed by a sensor is occupied or unoccupied can be calculated and updated.

The conventional occupancy mapping technologies do not consider the possible changes of the environment between observations and map queries. Consider one cell that was observed to be occupied currently while another cell was observed to be occupied several hours prior but not updated since. The two cells may have the same value of occupancy probability, but the actual probabilities of being currently occupied are not equal; the latter cell is more likely to be unoccupied due to possible environmental changes during the past several hours. Thus, conventional mapping technologies are unable to model such differences.

In one embodiment, the disclosure overcomes this deficiency by keeping a time stamp for each cell and a probability update algorithm depending not only on observations, but also on the time of each observation. With time-aware mapping, robots can benefit from more accurate maps with little cost increase. Table 1 shows examples where the disclosed embodiments can help autonomous devices make better movement decisions.

TABLE 1

Comparative Occupancy Mapping

| Scenario | Conventional Occupancy Maps | Disclosed Occupancy Maps (time-aware maps) |
| --- | --- | --- |
| Exploration: user asks robot to find an object which is not presented in its current map | Robot searches all the places | Robot first searches places it has not seen for a long time before those it has just looked around |
| Navigation: Robot has to pass a corridor that was crowded during last observation | Robot cannot find a path due to too many obstacles marked on the map | The obstacles has 'faded out' on the map. The robot plans a path like for an unknown place. |
| Localization: Robot comes to a place it has not been for a long time, and it has to localize itself | Localization is based on all the previously seen obstacles | Localization relies more on less movable objects (walls, trees, etc.) than highly movable ones (persons, chairs, etc.) |

Occupancy map has been used in robotics, for simultaneous localization and mapping (SLAM), navigation, motion planning and collision avoidance. The conventional mapping approaches (e.g., Octomap, HectorSLAM) use the log odds model as map updating policy. In these models, the log odds of each occupied cell is stored in the map. Whenever a new sensory observation suggests a cell is being occupied (or not), its log odds will be added by either a positive (for occupancy) or a negative (for non-occupancy) value. The value represents the confidence of the observation, depending only on the sensor and the observation model, irrelevant to the previous values in the map. This model is backed by the Bayes Law.

Figure 2:
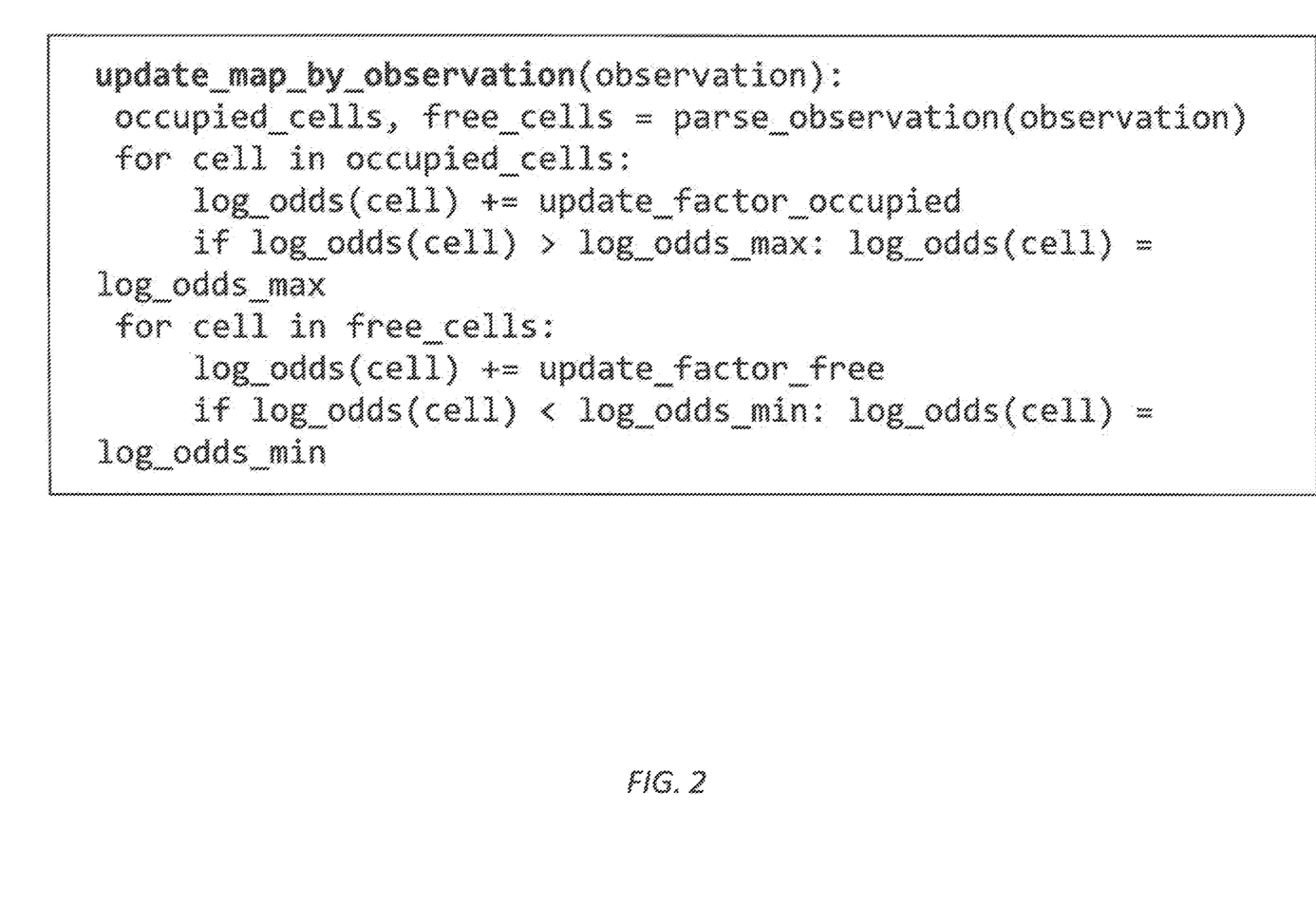
FIG. 2 shows an exemplary algorithm for map updating with the log odds model in pseudocode.

FIG. 2 shows an exemplary algorithm for map updating with the log odds model in pseudocode.

An occupancy map supports query of the occupancy state of each cell. A cell with a positive log odds is considered as occupied, negative is considered as free, and zero is considered as unknown (equivalent to a probability of 0.5, indicating no observation for the cell yet). Exact value of occupancy probability can also be derived from the log odds if needed. The relationship between a probability p and the correspondence log odds value l is provided in Equations (1) and (2) as follows:

$$l = \log \frac{p}{1-p} \quad (1)$$

$$p = \frac{1}{1+e^{-l}} \quad (2)$$

The conventional map update rule described above does not consider the time interval between observations. As a result, recent observations and those made long time ago have substantially the same weight in determining the occupancy probability. While this may be sufficient for static scenes, it would be highly error-prone for dynamic environments. With the time stamps, weights of the existing value and the new observation can be assigned during each cell update process. While different weighting formulas have been conventionally proposed, they all share the same principle that older values have smaller weights. This has been described with the terms of decay or aging.

The conventional occupancy mapping algorithms do not consider the duration between the time of observation and the time of map query. The duration matters because it affects the accuracy of the occupancy state. In mathematical language, the log odds for cell c in the map represents $$P(Occ_c^{t_c}|Obs^{\{0,1,\ldots,t_c\}}) \quad (3)$$

In Equation (3), $t_c$ is the time when c is most recently observed. But the most pertinent information to query is:

$$P(Occ_c^{t}|Obs^{\{0,1,\ldots,t_c\}}) \quad (4)$$

In Equation (4), t is current time. The probabilities described in Equations (3) and (4) are correlated, but the correlation decreases as $t-t_c$ increases. The problem becomes severe when robots are designed to work continuously for very long time in complex environments. The time-aware mapping methods in the literature use the time stamps only for map update, rather than general map queries. This limit the advantage of time-awareness from benefiting down-stream map users like robot navigation module. While it has been proposed to decay the entire map periodically to cure this deficiency, the proposed method cause significant computation overhead and storage bandwidth burden.

To overcome this and other shortcomings of the conventional methods, an embodiment of the disclosure is directed to an efficient mechanism of time-aware occupancy mapping. In certain embodiments, the occupancy probability value for each cell is stored together with the timestamp of the last update. Whenever the occupancy probability is needed, either for map updating or for an external query, the returned probability is calculated based on both the stored probability value and the time stamp, with Regression to Unknown (RTU) operation.

In certain embodiments, distinction is made between static and movable (dynamic) objects by assigning different regressing factors (or weights) for different cells upon their object categories. For example, different weight regressing factors may be given to walls than to movable furniture.

In another embodiment, the time stamps are used to merge overlapping maps of the same environment which may have been constructed by different robots.

The disclosed embodiments may be implemented with the existing software and hardware. Unlike conventional time-aware mapping algorithms, the disclosed embodiments do not require changing of other software components besides the occupancy map. Therefore, the disclosed embodiments can be easily integrated in robotics, automotive and drone technologies without the need for significant modification.

In certain disclosed embodiments, RTU is used to converge occupancy probability after a time interval to an unknown state. In one embodiment, RTU requires that the occupancy probability of one cell that is not observed should regress to a prior value indicating an unknown state (usually, 0.5). This is because the environment can change and a previously occupied cell may become free as the corresponding object may have been moved away and a previously free cell may be now be occupied. In time, the credibility of previous observations will continue to decrease. Thus, if a cell has not been observed for a very long time, its occupancy probability should converge to a neutral value, which indicates an unknown state.

Figure 3:
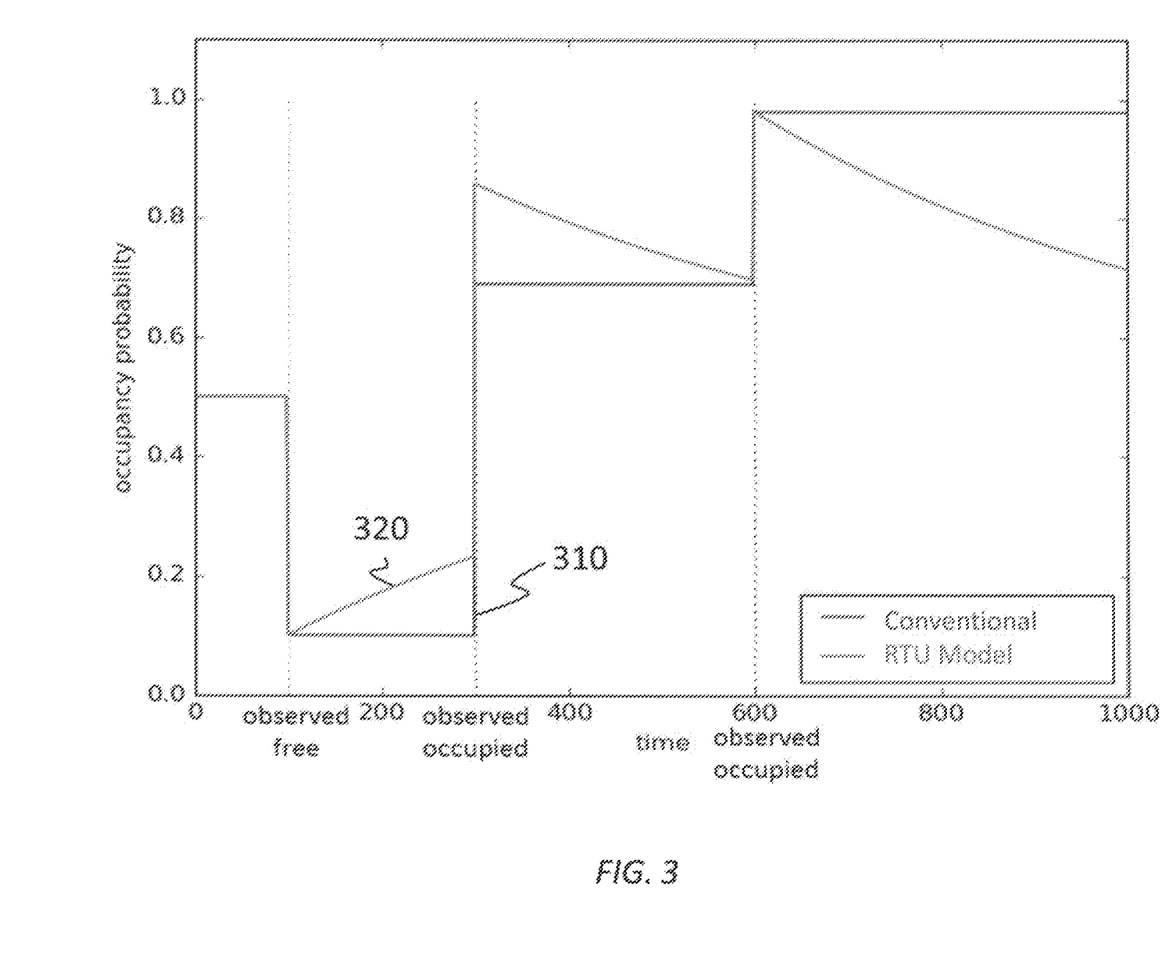
FIG. 3 comparatively illustrates application of an RTU model to occupancy mapping with a conventional model for occupancy mapping.

FIG. 3 comparatively illustrates application of an RTU model to occupancy mapping with a conventional model for occupancy mapping. Specifically, FIG. 3 shows an implementation according to one embodiment of the disclosure for changing the occupancy probability of a cells. In FIG. 3, line 310 represents cell occupancy probability mapping according to conventional technologies and line 320 represents occupancy probability mapping according to certain disclosed embodiments.

At time t=0 it is not known whether the cell is occupied. Accordingly, line 320 starts at 0.5; that is, the probability of occupancy of the cell is set to 50%. At the same time (t=0), the conventional method also gives a probability of 0.5 at t=0. Line 310 and 320 coincides from t=0 to t=100.

At time t=100, an observation is made (e.g., using sensors) and the cell is determined to be unoccupied. Here, the disclosed embodiments assign an occupancy probability value of about 0.1 (see line 320). The conventional models also assign an occupancy probability value of about 0.1. By way of background, the occupancy probability value is not set to zero to account for the noise inherent in the system.

At time t=300, another observation is made and the cell is found to be occupied. At this point, the occupancy probability value of the disclosed embodiment is increased to about 0.9 while the conventional occupancy probability value is set to 0.7 to denote occupancy of the cell.

It should be noted that the slope of the occupancy probability line 310 between t=100 to t=300 remains flat while the slope of the line 320 for the same duration is positive. The slope of the line 320 is due to the implementation of the RTU methodology. The RTU assumes that when the cell occupancy is unknown, the probability of whether the cell is occupied is about 50%. Thus, as time from the last measurement lapses (i.e., getting further away from the last known occupancy determination), the known occupancy probability converges to unknown. As a result, the RTU model assumes that the occupancy probability converges to 0.5 as time passes. As a result, line 320 has a positive slope, trending towards 0.5. In contrast, the conventional models assume that the occupancy probability does not change after the occupancy measurement confirmation. Thus, the slope of line 310 is substantially flat from t=100 to t=300.

At time t=600, another observation is made and occupancy determination is made that the cell is still occupied. As a result, line 310 showing the conventional modeling remains flat. In contrast, line 320—which indicates application of the RTU model—shows a negative slope from t=300 to t=600. At time 1=600, line 310 spikes upward to a value of about 0.9 to indicate occupancy of the cell under study. It should be noted that while the cell is identified as occupied both at t=300 and t=600, the probability of cell occupancy is spiked higher under the RTU model (i.e., to about 0.98 at t=600 versus about 0.9 at t=300). The spike at t=600 is higher because its initial value (about 0.7 at about t<600) is higher than that of t=300 (about 0.2 at about t<300). The same delta value is applied to the log odds of the probability for both t=300 and t=600 (see python script of FIG. 5 for details). This update strategy may be similar to the conventional methods. For example, at about t=600 the initial value of Line 310 and 320 are approximately the same (by coincidence), so their updated values are also approximately the same. In other words, the probability at about t=600 is higher because by this time the cell has been observed as occupied twice, so we are more confident for its occupancy. This is also true for the conventional method, say, the value of line 310 at t=600 is also higher than that at t=300.

No further measurement is made after time t=600. The conventional model, as indicated by line 310, holds the occupancy probability steady at about 0.98. Thus, the conventional model does not account for the possibility that the cell under study may become unoccupied. In contrast, the RTU model shows a downward slope, regressing toward occupancy probability value of about 0.5 as time lapses.

It should be noted that in certain embodiments, the RTU trending (regression to 0.5) need not be done for each point in time, but only when the occupancy probability is required. The frequency of map update may be determined by the operator.

In an exemplary implementation of the disclosed embodiments, a two step processed is performed in relation to occupancy probability data. First, for the data structure of the map, a time stamp may be stored for each cell along with the probability (or log odds, or any alternative representations of the probability). Second, whenever an occupancy probability is needed, an RTU operation is performed based on the time stamp in the map (indicating the time of last observation) and the time of query. It should be noted that the application of the two-step process is exemplary and non-limiting. That is, each of the steps may be performed independently or exclusive of the other step.

Under the first step, one or more sensor is used to determine sense presence of an object at a given cell. The results may be a binary value or may be a presented as a probability value. This information may be stored at a database along with the timestamp correlating to its determination. In one implementation, one or more sensors make occupancy determination of a given cell or a group of cells in the array. The information may be obtained directly by the robot's sensors or maybe communicated from other robots (or autonomous moving devices and vehicles). The information may then be stored and made available to the robot or collection of robots with the need to access the information. The occupancy information may be stored locally (e.g., at the robot or the autonomous vehicle's database) or at a server in communication with the moving device. As stated, the occupancy information may be stored along with its corresponding timestamp. Other information to indicate the location of the cell in the grid or the environment may also be stored. The stored information may be referred to as the data structure of the map.

The second step may be invoked when an occupancy probability is needed. According to one embodiment of the disclosure, whenever an occupancy probability is needed, an RTU operation may be performed based on the timestamp in the map. The timestamp may indicate the time of last observation and the time of the query.

Figure 4:
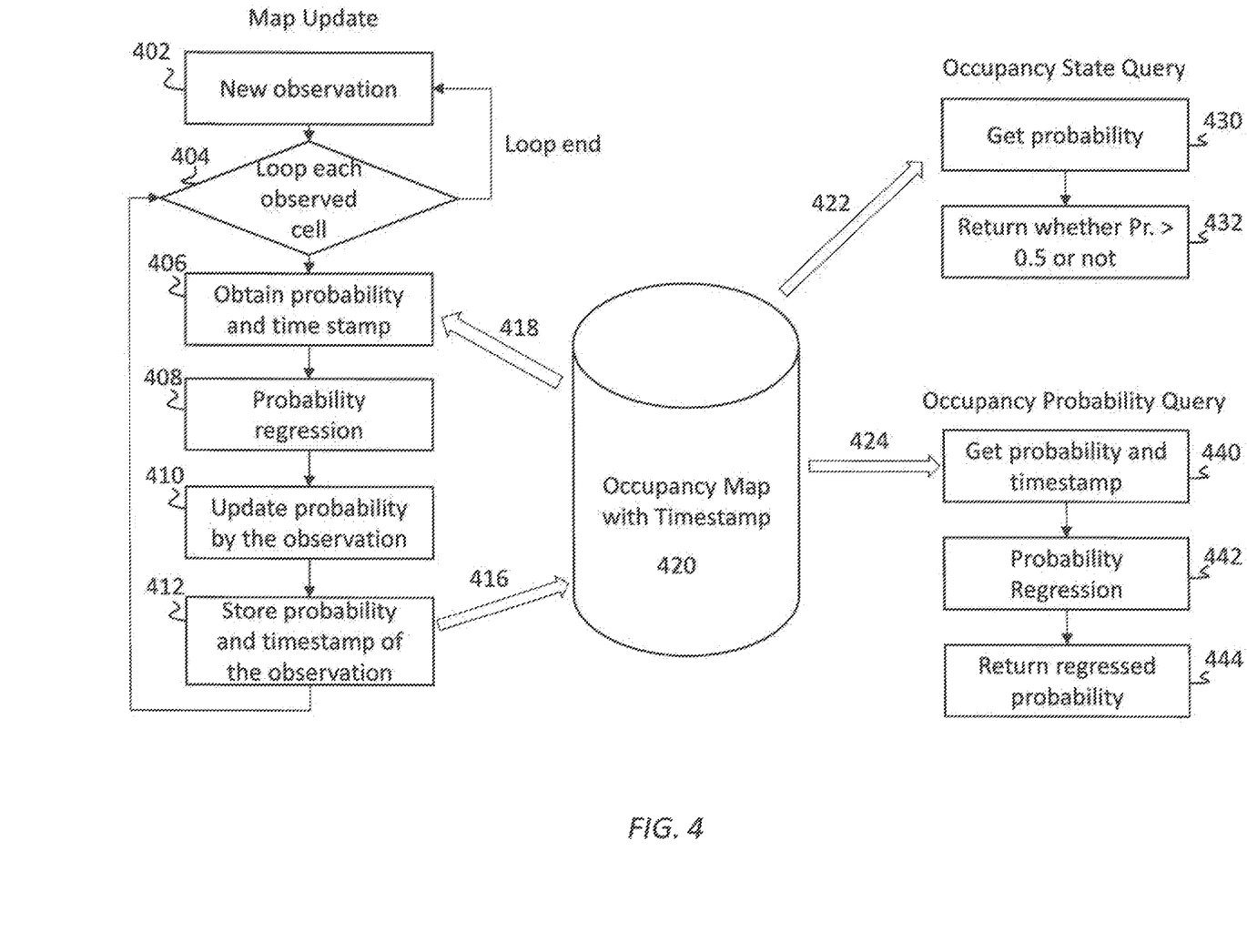
FIG. 4 shows an exemplary process of map update and query handling according to one embodiment of the disclosure.

FIG. 4 shows an exemplary process of map update and query handling according to one embodiment of the disclosure. Specifically, FIG. 4 schematically illustrates process flow diagram for three different occupancy map queries and update according to certain disclosed embodiments.

The map update process flow is illustrated on the left hand side of FIG. 4. This process is identified as "map update" and is intended to construct or update a map for an environment. The environment may comprise an indoor or an outdoor environment. The environment may be subdivided into a grid of cells. Thus, a grid may have a plurality of cells. Each cell may be identified as occupied or unoccupied. In one embodiment, each cell may be given a probability of occupancy ranging from 0 to 1, with 0.5 denoting an unknown cell occupancy.

The process flow of map update starts at step 402, where a new observation is made. The new observation may be made using one or more sensors as described above. The sensors may be coupled to a moving robot or an autonomous vehicle. In an alternative embodiment, the sensors may be mounted to a stationary post to continually scan an area to obtain new observations for cells associated with the scanned area. The step of looping each observed cell means that, in one embodiment, steps 406 to 412 may be applied to all the cells in the map except those outside of the sensor's view. For depth cameras for example, the observed cells may be the cells containing the location of each pixel point (observed as occupied) and those on the ray from the camera to a pixel point (observed as unoccupied)

At step 404, each observed cell is looped. If the observation is final, then the process proceeds to step 406; if not, the loop ends and returns to step 402. At step 406, occupancy probability and its associated time stamp for the observed cell are obtained from database 420 as shown by arrow 418.

At step 408, an occupancy probably RTU is calculated. The RTU may be determined according to any of several methods. An exemplary method for determining RTU is provided below. At step 410, the RTU value is used to update the observation made (i.e., probability value) made at the prior step. In certain embodiments, each cell in the grid can be associated with an observed value and its timestamp. Once the RTU value is determined, the occupancy probability information of the cell may be updated to include the most-recently determined RTU value. This is shown at step 410, where the cell (or a plurality of cells) are updated to update the probability value determined by the observation of step 402. In one embodiment (described further below), the RTU value is determined based on the initially-observed probability value (i.e., step 402).

At step 412, the updated probability and timestamp are stored at database 420 as shown by arrow 416. The process continues as shown by the arrow connecting steps 412 and 404.

At this point in the process, database 420 may comprise an occupancy map and associated timestamp for one or multiple cells in the grid. The occupancy map may comprise occupancy probability as observed by one or more sensors or it may include an updated occupancy probability as a function of an initial observation and RTU determination.

In response to an occupancy state query, the following routine may be implemented. At step 430, the relevant cell's probability and timestamp are retrieved from database 420, as indicated by arrow 422. At step 432, the results are communicated (or displayed). The results may include information as to whether the probability is greater than 0.5 (i.e., the cell is occupied) or not. It should be noted that the occupancy state query does not include RTU determination because there is no change in occupancy state.

The process for responding to an occupancy probability query is illustrated on the bottom right-hand side of FIG. 4. This process starts at step 440, where a probability value and its corresponding timestamp are retrieved from database 420 as shown by arrow 424. At step 442, an RTU determination is made as a function of the occupancy probability (step 440), the timestamp (step 440) and the duration since the last observation. Finally, at step 444, the regressed probability result is reported.

As stated, an embodiment of the disclosure provides application of an RTU to determined occupancy probability results. A principle of the RTU calculation is to push a probability value towards 0.5 (or any other pre-defined value) as time goes on. Any function that fulfills this purpose may be applied to the disclosed principles. The following is an exemplary method of one such application.

Consider the occupancy probability of a cell, denoted by $p_t$, where t is the discrete time interval. Assume the occupancy state to be a Markov chain, and its transition matrix is defined by Equation (5):

$$T = \begin{pmatrix} 1-a & a \\ b & 1-b \end{pmatrix} \tag{5}$$

where a is the probability of an occupied cell to be freed in the next time interval, b is the probability of a free cell to be occupied in the next time interval. Then, if no observation comes from time t to time t+k, there is shown in Equation (6):

$$(p_{t+k}, 1-p_{t+k}) = (p_t, 1-p_t) T^k \tag{6}$$

It can be calculated that:

$$T^k = \frac{1}{a+b} \begin{pmatrix} b+a(1-a-b)^k & a-a(1-a-b)^k \\ b-b(1-a-b)^k & a+b(1-a-b)^k \end{pmatrix} \tag{7}$$

Then Equation (8) provides:

$$p_{t+k} = \frac{1}{a+b}\{[b+a(1-a-b)^k]p_t + [b-b(1-a-b)^k](1-p_t)\} =$$

$$\frac{1}{a+b}[b+(1-a-b)^k(ap_t+bp_t-b)]$$

Next, define $$q = \frac{b}{a+b},$$

and γ=1−a−b, then there is $$p_{t+k} = q + \gamma^k (p_t - q) \tag{9}$$

This is the formula to perform RTU in our experiments. To be specific, $p_t$ is the probability stored in the occupancy map, k is the time intervals from the time stamp in the occupancy map to the time of query, and $p_{t+k}$ is the regressed probability. The constant q and γ are pre-defined parameters, which are discussed below. Note that formula (9) can work more generally than the assumptions during derivation. For example, k does not have to be an integer, meaning that it can work with continuous time spaces.

Regressing factor—For any function to perform RTU, there should be factors controlling the regression target and the regression speed. In the function we proposed in certain disclosed embodiments, q is the target which $p_{t+k}$ would converge to when k→∞, while γ∈(0,1) decides the convergence speed. It is worth noting that those factors can be set differently for different cells. For example, a cell that is occupied by a wall is obviously less likely to be freed than a cell occupied by a person. Therefore, it is reasonable in one embodiment to assign regression factors for each occupied cell according to the object category, for example, γ=0.9 for persons and γ=0.9999 for walls.

Merging multiple maps—In one embodiment of the disclosure, when there are multiple robots (or autonomous or semi-autonomous driving vehicles) operating in the same or overlapped area, it may be required to merge the maps constructed by different robots. This could be erroneous if the maps are only averaged, since the maps might be constructed at different times. When time stamps for each cell are available, more proper merging mechanisms can be designed. Thus, according to one embodiment of the disclosure, timestamps of the different occupancy maps are used to merge the relevant data into one updated database.

Thus, an embodiment of the disclosure relates to a time-aware-at-query occupancy grid mapping technology. A time-aware occupancy map contains a probability and a time stamp for each cell, and an RTU operation can be performed whenever handling a query to the occupancy probability of any cells. In this way robots (autonomous or semi-autonomous driving vehicles) can benefit from the discrimination between cells observed at different times.

In another embodiment of the disclosure, an RTU function may be used with theoretical basis: $p_{t+k}=q+\gamma^k(p_t-q)$. Other functions may be used without departing from the disclosure principles.

In still another embodiment, when semantic information is available, robots can easily benefit from the discrimination between different object categories by setting different regressing factors.

Another embodiment of the disclosure relates to merging maps from different autonomous sources. When multiple maps need to be merged, the time stamps for each grid cell can help produce better results.

Figure 5:
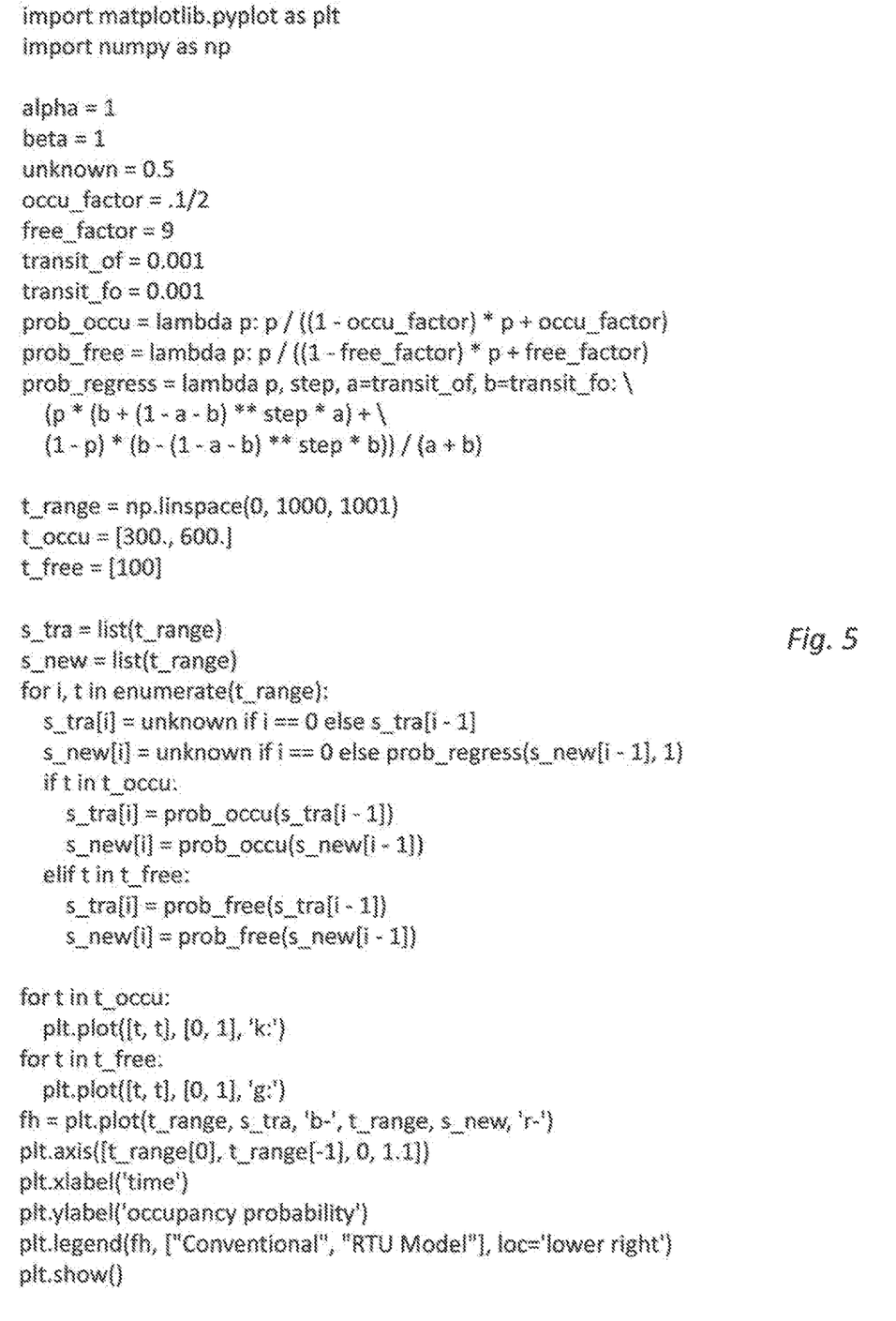
FIG. 5 shows an exemplary Python code for executing the occupancy probability shown in FIG. 3.

FIG. 5 shows an exemplary Python code for executing the occupancy probability shown in FIG. 1. Specifically, the exemplary Python code of FIG. 5 can be executed to provide occupancy probability of one or more cell in a grid of cells defining an environment. The code shown in FIG. 5 is exemplary and other algorithm may be used without departing from the disclosed principles.

The disclosed principles may be implemented in hardware, software or a combination of hardware and software (e.g., firmware). In certain applications, the disclosed embodiments may be merged with an autonomous device such as a self-driving vehicle or a robot. In certain embodiments, a processor circuitry may be programmed to implement steps disclosed herein, for example, the steps of flow diagram of FIG. 4. In one embodiment, an exemplary apparatus may comprise an AI CPU. For example, the apparatus may be a AI CPU implemented or executed at an autonomous or semi-autonomous device. In one exemplary embodiment, the autonomous or semi-autonomous device can be a vehicle or a robot. In certain embodiments, the AI or portions thereof, may be executed outside of the device.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software. In some embodiments, the disclosed embodiments may be implemented at one or more IoT devise. An IoT device may include various components (such as one or more components discussed with reference to the disclosed figures). Also, one or more embodiments may utilize a computing cloud (or more generally a "cloud"). The computing cloud may include various types of computing devices. These devices may be in digital communication via a cellular communication channel, a computer network, and/or the Internet. Also, one or more of the components discussed herein can be embodied as a System-On-Chip (SOC) device.

Figure 6:
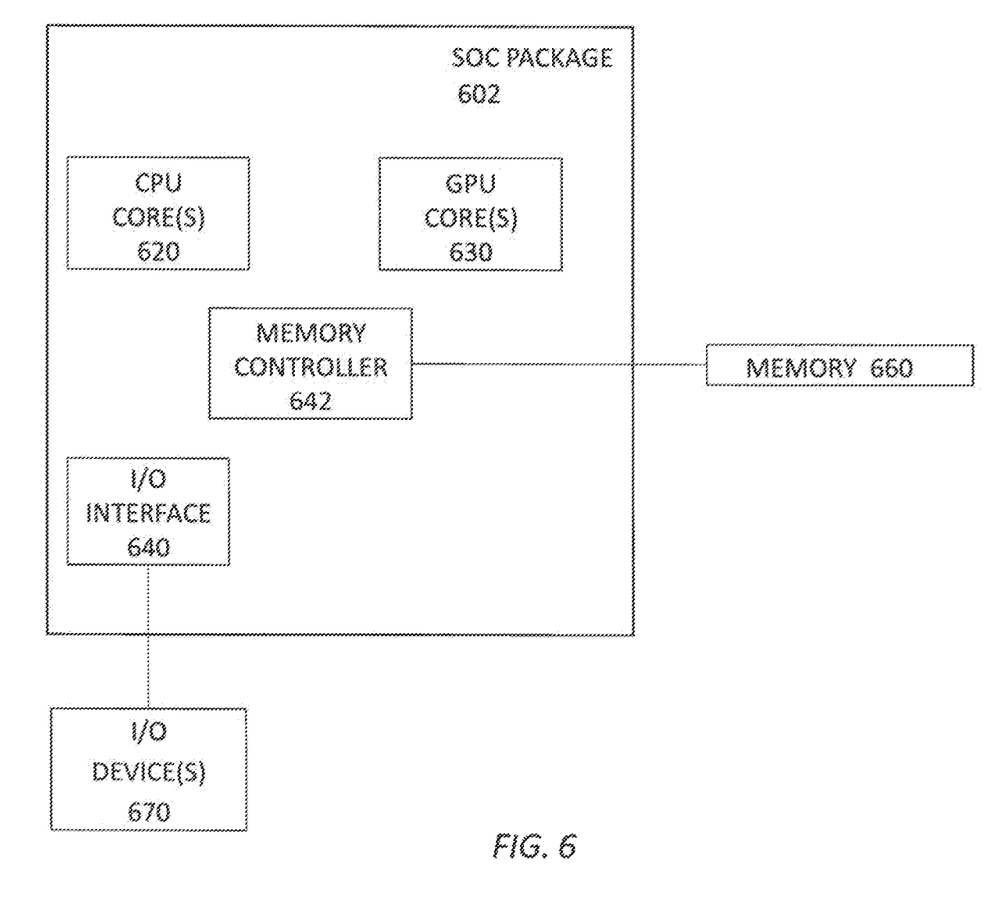
FIG. 6 illustrates a block diagram of an SOC package to execute one or more disclosed embodiments.

FIG. 6 illustrates a block diagram of an SOC package to execute one or more disclosed embodiments. As illustrated in FIG. 6, SOC 602 includes one or more Central Processing Unit (CPU) cores 620, one or more Graphics Processor Unit (GPU) cores 630, an Input/output (I/O) interface 640, and a memory controller 642. Various components of the SOC package 602 may be coupled to an interconnect or bus such as discussed herein with reference to the other figures. Also, the SOC package 602 may include more or less components, such as those discussed herein with reference to the other figures. Further, each component of the SOC package 620 may include one or more other components, e.g., as discussed with reference to the other figures herein. In one embodiment, SOC package 602 (and its components) is provided on one or more Integrated Circuit (IC) die, e.g., which are packaged into a single semiconductor device.

As illustrated in FIG. 6, SOC package 602 is coupled to a memory 660 via the memory controller 642. In an embodiment, the memory 660 (or a portion of it) can be integrated on the SOC package 602. Memory 602 may, for example, store occupancy probability and corresponding timestamp information discussed in relation to FIG. 4.

The I/O interface 640 may be coupled to one or more I/O devices 670, e.g., via an interconnect and/or bus such as discussed herein with reference to other figures. I/O device (s) 670 may include one or more of a keyboard, a mouse, a touchpad, a display, an image/video capture device (such as a camera or camcorder/video recorder), a touch screen, a speaker, or the like. In one exemplary embodiment, the I/O device may comprise a communication bus to communicate occupancy probability information to an external device.

Figure 7:
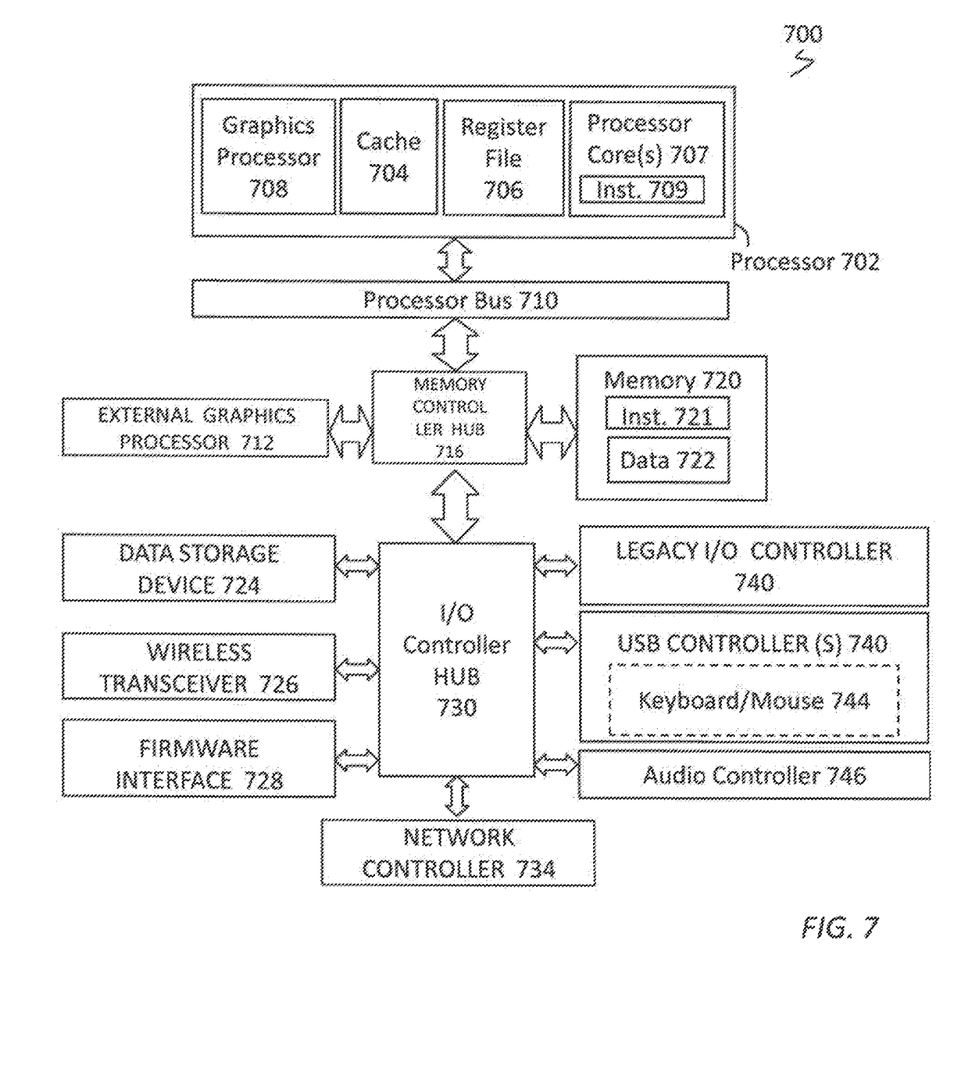
FIG. 7 is a block diagram of a processing system 700, according to an embodiment.

FIG. 7 is a block diagram of a processing system 700, according to an embodiment. Processing system 700 may be used to implement the occupancy probability determination for an environment according to the disclosed embodiments. In various embodiments the system 700 includes one or more processors 702 and one or more graphics processors 708, and may be a single processor desktop system, a multiprocessor workstation system, or a server system having a large number of processors 702 or processor cores 707. Processor 702 may, for example, execute the Python code of FIG. 5 or other algorithms disclosed herein. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based platform, a mobile device or a server. Processing system 700 can also include, couple with, or be integrated within a robot, an autonomous vehicle or a semi-autonomous vehicle.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit communication signals such as address, data, or control signals between processor 702 and other components in system 700. In one embodiment the system 700 uses an exemplary 'hub' system architecture, including a memory controller hub 816 and an Input Output (I/O) controller hub 730. A memory controller hub 716 facilitates communication between a memory device and other components of system 700, while an I/O Controller Hub (ICH) 730 provides connections to I/O devices via a local I/O bus. In one embodiment, the logic of the memory controller hub 716 is integrated within the processor.

Memory device 720 can be a dynamic random access memory (DRAM) device, a static random access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations.

In some embodiments, ICH 730 enables peripherals to connect to memory device 720 and processor 702 via a high-speed I/O bus. The I/O peripherals include, but are not limited to, an audio controller 746, a firmware interface 728, a wireless transceiver 726 (e.g., Wi-Fi, Bluetooth), a data storage device 824 (e.g., hard disk drive, flash memory, etc.), and a legacy I/O controller 740 for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710. It will be appreciated that the system 700 shown is exemplary and not limiting, as other types of data processing systems that are differently configured may also be used. For example, the I/O controller hub 730 may be integrated within the one or more processor 702, or the memory controller hub 716 and I/O controller hub 730 may be integrated into a discreet external graphics processor, such as the external graphics processor 712.

The following exemplary and non-limiting embodiments are presented to further illustrate the disclosed principles.

Example 1 is directed to an apparatus to dynamically allocate occupancy probability to a cell in an environment to thereby form a time-aware occupancy map of the environment, the apparatus comprising: a memory circuitry in communication with the processor circuitry, the memory circuitry configured to receive and store probability information from the processor circuitry and to store the probability value and its corresponding time stamp at a probability table; a processor circuitry in communication with the memory circuitry, the processor circuitry configured to: receive occupancy information, the occupancy information defining whether a first of a plurality of cells in the environment is occupied, determine a first probability value that the first cell is occupied at a first point in time, direct the first probability value and its corresponding timestamp to the memory circuitry to store, determine a second probability value that the first cell is occupied at a second point in time, the second point in time defined by a lapsed interval from the first point in time to the second point in time, and update the memory circuitry to store the second probability value and its corresponding timestamp; wherein the second probability value is determined as a Regression to Unknown (RTU) probability estimation as a function of a speed of regression (Y) value and the lapsed interval between the first and the second points in time (k).

Example 2 is directed to the apparatus of example 1, wherein the processor is configured to identify the first of the plurality of cells by identifying the location of the first cell.

Example 3 is directed to the apparatus of example 1, wherein the processor circuitry is configured to receive occupancy information of the first cell from one or more sensors.

Example 4 is directed to the apparatus of example 1, further comprising one or more sensors.

Example 5 is directed to the apparatus of example 4, wherein the sensor includes a transmitter configured to transmit a sensing signal and a receiver configured to receive the sensing signal reflected and returning to the sensing equipment.

Example 6 is directed to the apparatus of example 4, wherein the sensor comprises one or more of a camera, sonar, radar or LiDAR.

Example 7 is directed to the apparatus of example 1, wherein the processor is further configured to update the time-aware occupancy map by determining an RTU probability value for each of the plurality of cells in the environment.

Example 8 is directed to the apparatus of example 1, further comprising assigning an RTU constant value as a function of weather an identified object in the first cell is static or dynamic.

Example 9 is directed to the apparatus of example 1, further comprising determining the RTU as a function of a predefined parameter (q).

Example 10 is directed to at least one machine-readable medium including instructions, to dynamically allocate occupancy probability to one or more cells in an environment, which when executed, causes one or more processors to: identify a plurality of cells in an environment, the plurality of cells defining the environment as a grid of cells; for a first cell in the plurality of cells, determine a first probability value that the first cell is occupied at a first point in time; store the first probability value and its corresponding time stamp at a probability table: determine a second probability value that the first cell is occupied at a second point in time, the second point in time defined by a lapsed interval from the first point in time to the second point in time: update the probability table by storing the second probability value: wherein the second probability value is determined as a Regression to Unknown (RTU) probability estimation as a function of a speed of regression (Y) value and the lapsed interval between the first and the second points in time (k).

Example 11 is directed to the machine-readable medium of example 10, wherein the first probability value is determined using a sensor to detect presence of an object in the cell and wherein the probability value is set to a predefined value for an unknown probability.

Example 12 is directed to the machine-readable medium of example 11, wherein the sensor includes a transmitter configured to transmit a sensing signal and a receiver configured to receive the sensing signal reflected and returning to the sensing equipment.

Example 13 is directed to the machine-readable medium of example 11, wherein the sensor comprises one or more of a camera, sonar, radar or LiDAR.

Example 14 is directed to the machine-readable medium of example 10, wherein the instructions further cause the processor to update the time-aware occupancy map by determining an RTU probability value for each of the plurality of cells in the environment.

Example 15 is directed to the machine-readable medium of example 10, wherein the instructions further cause the processor to determine and store the first probability value and its corresponding time stamp for a group of cells in the plurality of cells in the grid.

Example 16 is directed to the machine-readable medium of example 10, wherein the instructions further cause the processor to assign an RTU constant value as a function of an identified object in the first cell and wherein the identified object is one of a movable or substantially stationary object.

Example 17 is directed to the machine-readable medium of example 10, wherein the instructions further cause the processor to determine the RTU as a function of a predefined parameter (q).

Example 18 is directed to a method to provide time-aware occupancy map, the method comprising: identifying a plurality of cells in an environment, the plurality of cells defining the environment as a grid of cells: for a first cell in the plurality of cells, determining a first probability value that the first cell is occupied at a first point in time: storing the first probability value and its corresponding time stamp at a probability table; determining a second probability value that the first cell is occupied at a second point in time, the second point in time defined by a lapsed interval from the first point in time to the second point in time; updating the probability table by storing the second probability value: wherein the second probability value is determined as a Regression to Unknown (RTU) probability estimation as a function of a speed of regression (Y) value and the lapsed interval between the first and the second points in time (k).

Example 19 is directed to the method of example 18, wherein the first probability value is determined using a sensor to detect presence of an object in the cell and wherein the probability value is a predefined number for an unknown probability.

Example 20 is directed to the method of example 19, wherein the sensor includes a transmitter configured to transmit a sensing signal and a receiver configured to receive the sensing signal reflected and returning to the sensing equipment.

Example 21 is directed to the method of example 19, wherein the sensor comprises one or more of a camera, sonar, radar or LiDAR.

Example 22 is directed to the method of example 18, further comprising updating the time-aware occupancy map by determining an RTU probability value for each of the plurality of cells in the environment.

Example 23 is directed to the method of example 18, further comprising determining and storing the first probability value and its corresponding time stamp for a group of cells in the plurality of cells in the grid.

Example 24 is directed to the method of example 18, further comprising assigning an RTU constant value as a function of an identified object in the first cell and wherein the identified object is one of a movable or substantially stationary object.

Example 25 is directed to the method of example 18, further comprising determining the RTU as a function of a predefined parameter (q).

Example 26 is directed to the method of example 18, wherein the first probability value is one of a probability number or a log odd value of the probability.

While the principles of the disclosure have been illustrated in relation to the exemplary embodiments shown herein, the principles of the disclosure are not limited thereto and include any modification, variation or permutation thereof.

What is claimed is:

1. An apparatus to dynamically allocate occupancy probability to a cell in an environment to thereby form a time-aware occupancy map of the environment, the apparatus comprising:
a non-transitory memory circuitry comprising instructions for allocating occupancy probability in the environment and in communication with a processor circuitry, the memory circuitry configured to receive and store probability information from the processor circuitry and to store the probability value and its corresponding time stamp at a probability table;
wherein the processor circuitry is further-configured to:
receive occupancy information in real-time, the occupancy information defining whether a first of a plurality of cells in the environment is occupied,
form the time-aware occupancy map by dynamically allocating occupancy probability values to cells in the environment,
determine a first probability value that the first cell is occupied at a first point in time,
direct the first probability value and its corresponding timestamp to the memory circuitry to store,
determine a second probability value that the first cell is occupied at a second point in time in real-time, the second point in time defined by a lapsed interval from the first point in time to the second point in time, and dynamically update the time-aware occupancy map by storing the second probability value and its corresponding timestamp in the memory circuitry in real-time;

wherein the second probability value is determined as a Regression to Unknown (RTU) probability estimation as a function of a speed of regression (Y) value and the lapsed interval between the first and the second points in time (k) to mitigate inaccuracies caused by environmental changes between receipts of occupancy information.

2. The apparatus of claim 1, wherein the processor circuitry is further configured to identify the first of the plurality of cells by identifying the location of the first cell.

3. The apparatus of claim 1, wherein the processor circuitry is further configured to receive occupancy information of the first cell from one or more sensors.

4. The apparatus of claim 1, further comprising one or more sensors in communication with the processor circuitry.

5. The apparatus of claim 4, wherein the at least one of the sensors further comprise a transmitter configured to transmit a sensing signal and a receiver configured to receive the sensing signal reflected and returning to the sensing equipment.

6. The apparatus of claim 4, wherein at least one of the sensors comprises one or more of a camera, sonar, radar or LiDAR.

7. The apparatus of claim 1, wherein the processor circuitry is further configured to update the time-aware occupancy map by determining an RTU probability value for each of the plurality of cells in the environment.

8. The apparatus of claim 1, further comprising assigning an RTU constant value as a function of whether an identified object in the first cell is static or dynamic.

9. The apparatus of claim 1, wherein the processor circuitry is further configured to determine the RTU as a function of a predefined parameter (q).

10. At least one non-transient, machine-readable medium, including instructions implemented on a processor, to dynamically allocate occupancy probability to one or more cells in an environment, which when executed, causes one or more processors to:

identify a plurality of cells in an-the environment, the plurality of cells defining the environment as a grid of cells;

for a first cell in the plurality of cells, receive occupancy information in real-time, the occupancy information defining whether the first cell is occupied;

form a time-aware occupancy map by dynamically allocating occupancy probability values to cells in the environment;

determine a first probability value that the first cell is occupied at a first point in time;

store the first probability value and its corresponding time stamp at a probability table;

determine a second probability value that the first cell is occupied at a second point in time in real-time, the second point in time defined by a lapsed interval from the first point in time to the second point in time;

dynamically update the probability table by storing the second probability value and its corresponding timestamp in the probability table in real-time;

wherein the second probability value is determined as a Regression to Unknown (RTU) probability estimation as a function of a speed of regression (Y) value and the lapsed interval between the first and the second points in time (k) to mitigate inaccuracies caused by environmental changes between receipts of occupancy information.

11. The machine-readable medium of claim 10, wherein the first probability value is determined using a sensor to detect presence of an object in the cell and wherein the probability value is set to a predefined value for an unknown probability.

12. The machine-readable medium of claim 11, wherein the sensor includes a transmitter configured to transmit a sensing signal and a receiver configured to receive the sensing signal reflected and returning to the sensing equipment.

13. The machine-readable medium of claim 11, wherein the sensor comprises one or more of a camera, sonar, radar or LiDAR.

14. The machine-readable medium of claim 10, wherein the instructions further cause the processor to update the time-aware occupancy map by determining an RTU probability value for each of the plurality of cells in the environment.

15. The machine-readable medium of claim 10, wherein the instructions further cause the processor to determine and store the first probability value and its corresponding time stamp for a group of cells in the plurality of cells in the grid.

16. The machine-readable medium of claim 10, wherein the instructions further cause the processor to assign an R TU constant value as a function of an identified object in the first cell and wherein the identified object is one of a movable or substantially stationary object.

17. The machine-readable medium of claim 10, wherein the instructions further cause the processor to determine the RTU as a function of a predefined parameter (q).

* * * * *